(12) United States Patent
Last

(10) Patent No.: US 10,086,393 B2
(45) Date of Patent: Oct. 2, 2018

(54) FLUID DOSE-MEASURING DEVICE

(71) Applicant: IPN IP B.V., Houten (NL)

(72) Inventor: Laurens Last, Bosch en Duin (NL)

(73) Assignee: Scholle IPN IP BV (NL)

( * ) Notice: Subject to any disclaimer, the term of this patent is extended or adjusted under 35 U.S.C. 154(b) by 0 days.

(21) Appl. No.: 14/915,397

(22) PCT Filed: Aug. 27, 2014

(86) PCT No.: PCT/NL2014/050579
§ 371 (c)(1),
(2) Date: Feb. 29, 2016

(87) PCT Pub. No.: WO2015/030583
PCT Pub. Date: Mar. 5, 2015

(65) Prior Publication Data
US 2016/0214129 A1    Jul. 28, 2016

(30) Foreign Application Priority Data

Aug. 28, 2013  (NL) ..................................... 2011347

(51) Int. Cl.
*B67D 7/66*      (2010.01)
*B05B 11/00*     (2006.01)
*G01F 11/00*     (2006.01)
*G01F 13/00*     (2006.01)

(52) U.S. Cl.
CPC ........ *B05B 11/3052* (2013.01); *B05B 11/007* (2013.01); *G01F 11/00* (2013.01); *G01F 13/00* (2013.01)

(58) Field of Classification Search
CPC ..... B05B 11/3052; B05B 11/007; G01F 11/00
USPC ...... 222/385, 383.2, 251, 321.7, 321.9, 372, 222/383.1, 400.8, 401, 162, 636, 220, 222/264, 444
See application file for complete search history.

(56) References Cited

U.S. PATENT DOCUMENTS 2,790,394 A * 4/1957 Mori .................. F04C 2/113
                                                    222/255
3,623,829 A * 11/1971 Shaw .................. F16H 1/32
                                                    418/171
4,240,567 A * 12/1980 Gardner ................ B05C 11/10
                                                    222/146.5
(Continued)

*Primary Examiner* — Patrick M Buechner
*Assistant Examiner* — Michael J Melaragno
(74) *Attorney, Agent, or Firm* — The Watson IP Group, PLC; Jovan N. Jovanovic; Vladan M. Vasiljevic

(57) ABSTRACT

The invention relates to a fluid dose-measuring device for dispensing predetermined amounts of fluid from a fluid container, comprising a housing with a stationary and a moveable part, wherein the stationary part comprises a connector portion defining an inlet passage, which connector portion is connectable to the fluid container, wherein the moveable part is configured to engage with an actuator of a dispensing device, and wherein the housing comprises an outlet through which the fluid is to be dispensed, and an internal gear pump with an inner and an outer gear for transporting fluid from the inlet passage to the outlet upon actuation by the actuator of the dispensing device, wherein the moveable part is connected to the outer gear, so that actuation of the moveable part allows to rotate the inner and outer gear relative to the stationary part.

19 Claims, 5 Drawing Sheets

(56) References Cited

U.S. PATENT DOCUMENTS

| | | | | |
|---|---|---|---|---|
| 4,451,954 A * | 6/1984 | Muller | ................... | A22C 11/06 222/18 |
| 5,135,371 A * | 8/1992 | Arbogast | ............ | F04C 15/0019 418/124 |
| 6,126,045 A * | 10/2000 | Last | ....................... | B65D 41/02 137/614.2 |
| 6,142,750 A * | 11/2000 | Benecke | ................. | A47L 13/20 222/383.2 |
| 6,974,052 B1 * | 12/2005 | d'Hond | ................... | G01F 11/22 222/383.2 |
| 7,021,494 B2 * | 4/2006 | Mazooji | ................. | A47K 3/281 222/181.1 |
| 7,163,034 B2 * | 1/2007 | Franks | ................. | B67D 7/0205 141/384 |
| 7,503,745 B2 * | 3/2009 | Whitehouse | .............. | B01F 5/16 222/129.1 |
| 7,624,898 B2 * | 12/2009 | Hornsby | ................... | B05B 1/34 222/325 |
| 7,837,132 B2 * | 11/2010 | Mazooji | .................... | B05B 3/02 239/263.1 |
| 2006/0138168 A1 * | 6/2006 | Last | ....................... | B65D 35/28 222/105 |
| 2006/0144857 A1 * | 7/2006 | Last | ..................... | B67D 3/0012 222/105 |
| 2007/0194053 A1 * | 8/2007 | Ophardt | ............... | A47K 5/1202 222/189.01 |
| 2007/0272317 A1 * | 11/2007 | Klopfenstein | ....... | B67D 1/0031 137/889 |
| 2008/0173705 A1 * | 7/2008 | Girard | ................... | A47J 31/402 235/375 |
| 2011/0315709 A1 * | 12/2011 | Fileccia | .............. | A47L 15/0055 222/1 |
| 2012/0031930 A1 * | 2/2012 | Fileccia | .............. | A47L 15/4454 222/325 |
| 2012/0261441 A1 * | 10/2012 | van den Hoonaard | ..................... | G01F 11/029 222/504 |
| 2014/0054323 A1 * | 2/2014 | McNulty | .................. | A47K 5/14 222/190 |
| 2015/0320265 A1 * | 11/2015 | Bullock | ............... | A47K 5/1217 222/1 |
| 2016/0214129 A1 * | 7/2016 | Last | ........................ | G01F 11/00 |

* cited by examiner

FIG 4
FIG 5
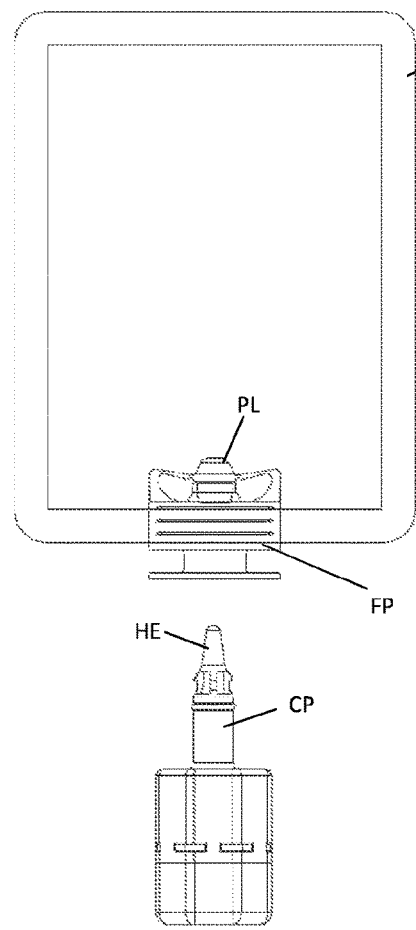
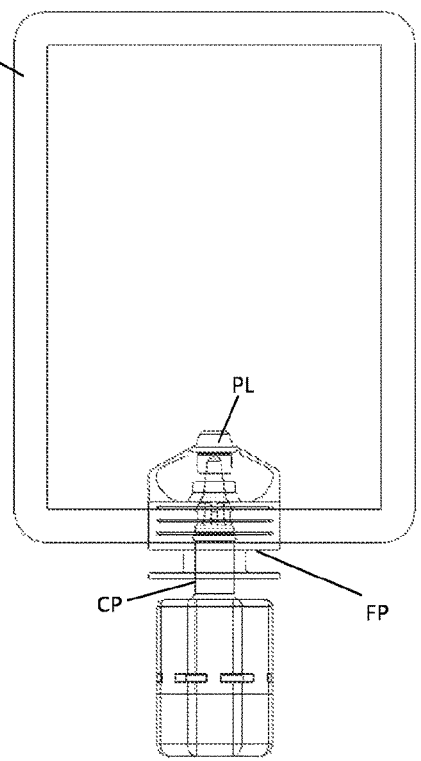

FLUID DOSE-MEASURING DEVICE

The invention relates to a fluid dose-measuring device adapted to dispense predetermined amounts of fluid from a fluid container.

Such a device is known for instance from U.S. Pat. No. 3,258,166. This document discloses a device comprising a housing with an outlet defining a valve seat, an electromagnetic actuator for discharging metered quantities of liquid from a container, and including a piston which is in sealing engagement with the valve seat when the coil of the electromagnetic device is de-energized, but rises above the valve seat to permit the escape of liquid when the coil is energized. The escape of liquid may be caused by gravity or pressure inside the container. Especially for relatively high viscosity liquids, the liquid may also be forced through the outlet by oscillation of the piston.

The device can function as a valve when the piston due to its reciprocating movement merely opens or closes a fluid path from inlet passage to outlet passage, so that the amount of escaped fluid is, amongst others, determined by the time the fluid path is open. Fluid is then forced out of the container by gravity and/or pressure inside the container and the piston is only reciprocated for opening and closing. This type of dose-measuring device is typically used for low-viscosity fluids.

The device can function as a pump when the piston displaces fluid through the outlet passage using a reciprocating motion of the piston. The device, and in particular the piston, may then be provided with valves, in particular non-return valves, such as for instance disclosed in U.S. Pat. No. 4,487,556. Each time, the piston reciprocates, an amount of fluid is dispensed through the outlet. The flow rate is determined amongst others by the stroke of the piston and the frequency of reciprocations. This type of dose-measuring device is typically used for high-viscosity fluids, but can also be used for low-viscosity fluids. As the flow rate is determined by the stroke and frequency of reciprocations of the piston, the amount of dispensed fluid is fairly predictable. This makes this type therefore more suitable for accurate dose-measuring than a device which functions as a valve.

A combination as described in U.S. Pat. No. 3,258,166, in which the device primarily functions as a valve, but oscillation of the piston aids in forcing the fluid through the outlet passage, is also possible.

The piston is actuated by an electromagnetic field interacting with ferromagnetic material in the piston. As is known in the art, an electromagnetic field can be produced in many ways. However, the electromagnetic field is preferably produced with a coil, e.g. solenoid coil or also referred to as electromagnetic coil, as this allows easy control of the electromagnetic field. By appropriately energizing the coil, the piston will move in one direction. The piston may move back to the original position to form a single reciprocation by de-energizing the coil in combination with gravity, pressure inside the container or a spring force applied by a spring element, or may return to its original position by appropriately energizing the coil again.

As the ferromagnetic material has to interact with an electromagnetic field, the housing is permeable to the electromagnetic field, i.e. permeable to a magnetic flux.

An application of the fluid dose-measuring devices can be found in beverage dispensers using liquid beverage concentrate which is mixed with water, e.g. hot or cold water. The concentrate is then dispensed from a container by a dose-measuring device. Another application can be found in pharmaceutical devices in which for instance two substances have to be mixed, or a single substance has to be delivered to a patient in a specific dose over time.

As known in the art, the dose-measuring device may be permanently integrated with a container which after being emptied is thrown away with preferably minimal influence on the environment. An advantage of combining the container and a dose-measuring device in a disposable unit is that it simplifies the use for an operator or user when installing or removing the container with dose-measuring device as the connection between the container and device is already made and does not have to be removed after usage. The fluid dose-measuring device is therefore also preferably disposable or recyclable. In that case, the solenoid coil is preferably not part of the dose-measuring device, but part of a dispensing device which receives the dose-measuring device with container.

Especially when the dose-measuring device is used for fluids in the food or pharmaceutical industry, the piston will have to meet certain requirements. These requirements make the fabrication of the piston complex and laborious.

It is therefore an object of the invention to provide an improved fluid dose-measuring device which can be used in the food or pharmaceutical industry, but at the same time can easily be fabricated.

In order to obtain the object of the invention there is provided, according to a first aspect of the invention, a fluid dose-measuring device according to claim 1.

The first aspect of the invention is based on the use of an internal gear pump, where the outer gear of the internal gear pump is also part of the housing, i.e. driving the moveable part of the housing will drive the outer gear to dispense fluid from the container.

The moveable part and the outer gear may therefore be connected or fixed to each other, but it is also possible that the moveable part and the outer gear form an integral component, i.e. are fabricated as a single component, e.g. by molding.

Using an internal gear pump as the element responsible for the transportation of fluid through the device allows more freedom in the choice of material, because no longer a ferromagnetic part is required. By combining the outer gear with the housing, less parts may be required and it allows to easily drive the internal gear pump with an actuator of the dispensing device, which actuator can engage with an external portion of the fluid dose-measuring device.

In an embodiment, the fluid dose-measuring device is adapted to be releasably received in the dispensing device, wherein the fluid dose-measuring device is preferably disposable. In an embodiment, the stationary part comprises a top wall and a peripheral wall extending from the top wall, wherein the connector portion extends from the top wall opposite the peripheral wall.

In an embodiment, the moveable part comprises a bottom wall and a peripheral wall extending from the bottom wall, said peripheral wall having over at least a part of its height an outer shape for engagement with the actuator of the dispensing device and an inner shape forming the outer gear of the internal gear pump.

In an embodiment, the peripheral wall of the moveable part sealingly engages with the peripheral wall of the stationary part. The sealing engagement between the two periperhal walls prevents leakage of fluid between the moveable and stationary part of the housing.

In an embodiment, the fluid dose-measuring device further comprises an axle part around which the inner gear can rotate.

In an embodiment, the axle part comprises an outlet passage for guiding fluid to the outlet of the housing.

In an embodiment, the internal gear pump comprises an intake side where fluid is drawn from the fluid container and a compression side where fluid is expelled towards an outlet, wherein the intake side is in fluid communication with the connector part.

In an embodiment, the compression side is in fluid communication with the outlet passage of the axle part.

The outlet may be provided in the moveable or the stationary part. The outlet may further be formed by the axle part.

In an embodiment, the outlet comprises a valve element, wherein the valve element preferably comprises an elastomer part such that the resiliency of the valve element can be used to open and close the valve.

In an embodiment, the elastomer part functions as a slit valve.

In an embodiment, the elastomer part of the valve element is connected to the moveable part of the housing, wherein the axle part comprises a profiled end engaging with the elastomer part of the valve element, such that upon rotation of the moveable part including elastomer part relative to the profiled tip the valve is periodically opened and closed.

In an embodiment, the device further comprises a valve element with a stationary member and a rotatable member engaging with one another, wherein one of the stationary and rotatable member comprises elastomer material and the other one is substantially undeformable, wherein one of the stationary and rotatable member is connected to the moveable part of the housing and the other one of the stationary and rotatable member is connected to the stationary part, and wherein rotation of the rotatable member relative to the stationary member periodically opens and closes the valve due to deformation of the elastomer material.

In an embodiment, the rotatable member surrounds the stationary member, wherein the stationary member has a profiled shape, and wherein the rotatable member has a shape complementary to the profiled shape.

According to a second aspect of the invention, there is provided a fluid dose-measuring device according to claim 18. The fluid dose-measuring device according to the second aspect provides the possibility to use the axle as a fluid guide, thereby having more design freedom for the positioning of the outlet.

In an embodiment, the intake side and the compression side are arranged at the same side of the internal gear pump.

In an embodiment, the inlet passage and the outlet passage extend substantially in the same direction, which direction is preferably parallel to the rotation axes of the inner and outer gear of the internal gear pump, and are preferably substantially aligned with each other. This allows for an alignment of the inlet and outlet which is normally not possible when using an internal gear pump.

According to a third aspect of the invention, there is provided a fluid dose-measuring device comprising a valve element with a stationary member and a rotatable member engaging with one another, wherein one of the stationary and rotatable member comprises elastomer material and the other one is substantially undeformable, wherein rotation of the rotatable member relative to the stationary member periodically opens and closes the valve due to deformation of the elastomer material.

The fluid dose-measuring device according to the third aspect allows for a valve that is able to better close off the outlet as the force for opening does not have to come from fluid pressure, but originates from driving the pump.

In an embodiment, the rotatable member surrounds the stationary member, wherein the stationary member has a profiled shape, and wherein the rotatable member has a shape complementary to the profiled shape.

The invention according to the first, second and third aspect will now be described in more detail by reference to the accompanying drawings in which like parts are indicated by like reference symbols, and in which:

FIG. 4 depicts the fluid dose-measuring device of FIG. 1 prior to or after being connected to a fluid container;

FIG. 5 depicts the fluid dose-measuring device of FIG. 1 connected to a fluid container;

FIGS. 1-7 depict a fluid dose-measuring device according to an embodiment of the invention.

Figure 1:
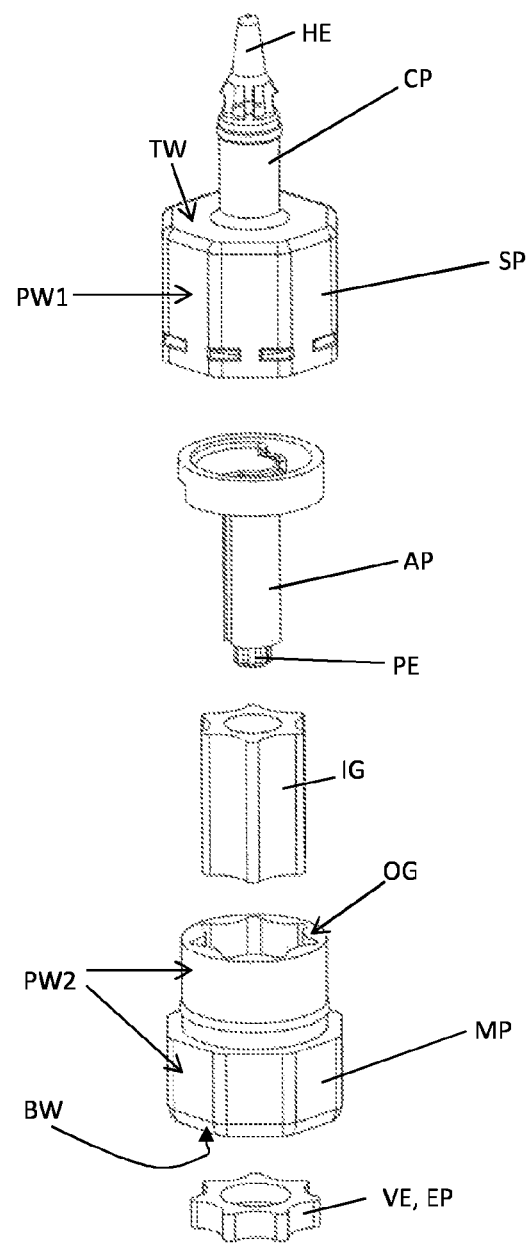
FIG. 1 depicts an exploded view of a fluid dose-measuring device according to an embodiment of the invention.
Figure 2:
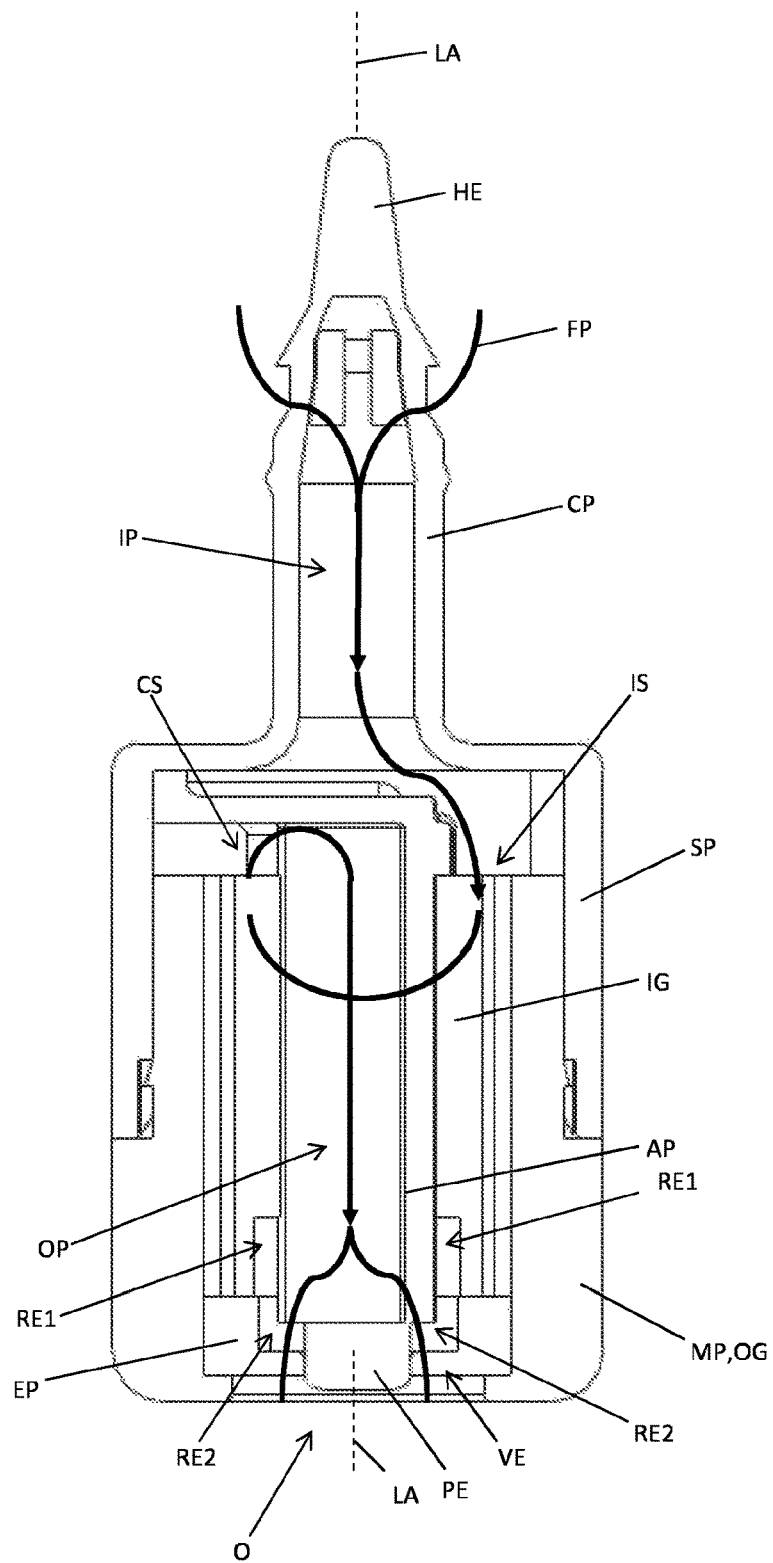
FIG. 2 depicts a cross-sectional view of the fluid dose-measuring device of FIG. 1.
Figure 3:
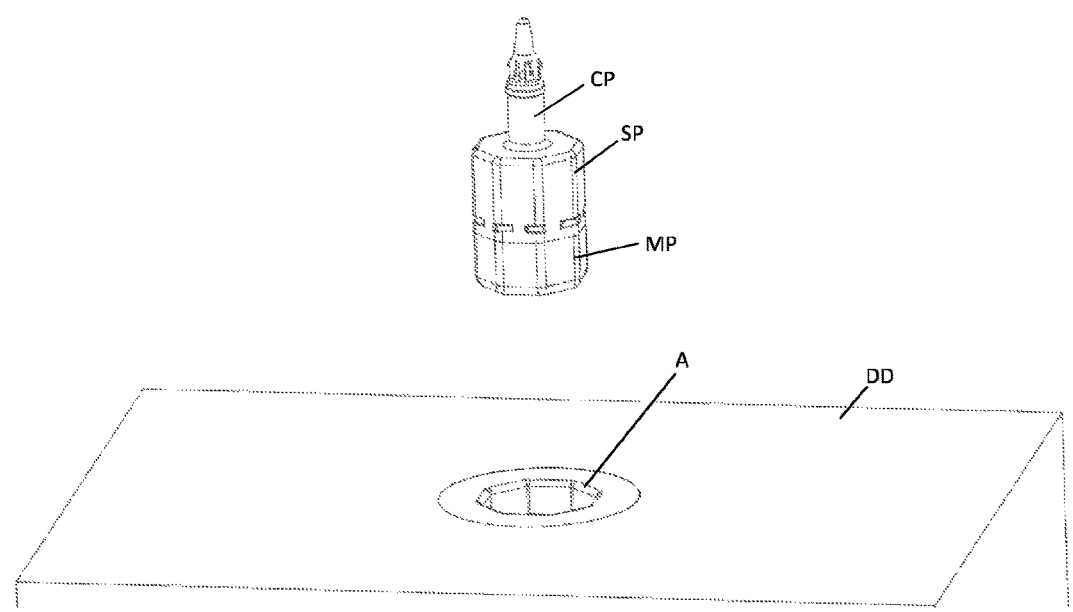
FIG. 3 depicts the fluid dose-measuring device of FIG. 1 prior to being positioned into a dispensing device.
Figure 6:
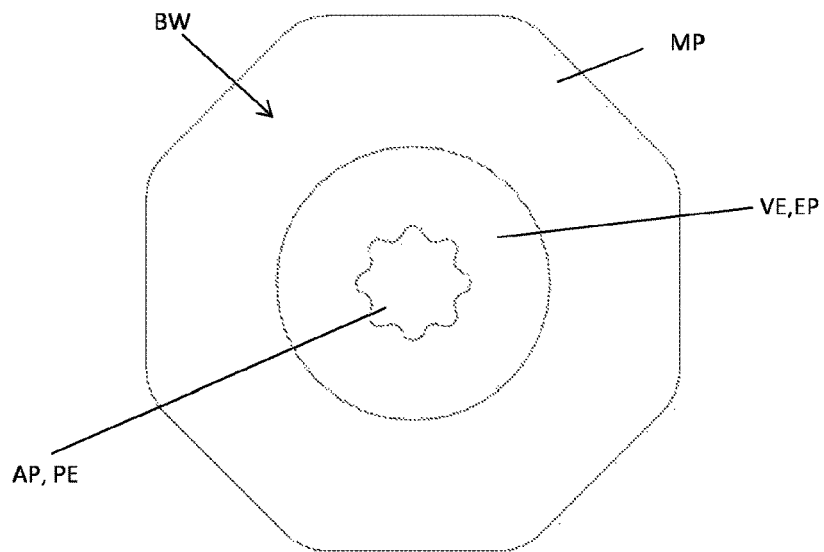
FIG. 6 depicts a bottom view of the fluid dose-measuring device of FIG. 1 in a first situation.
Figure 7:
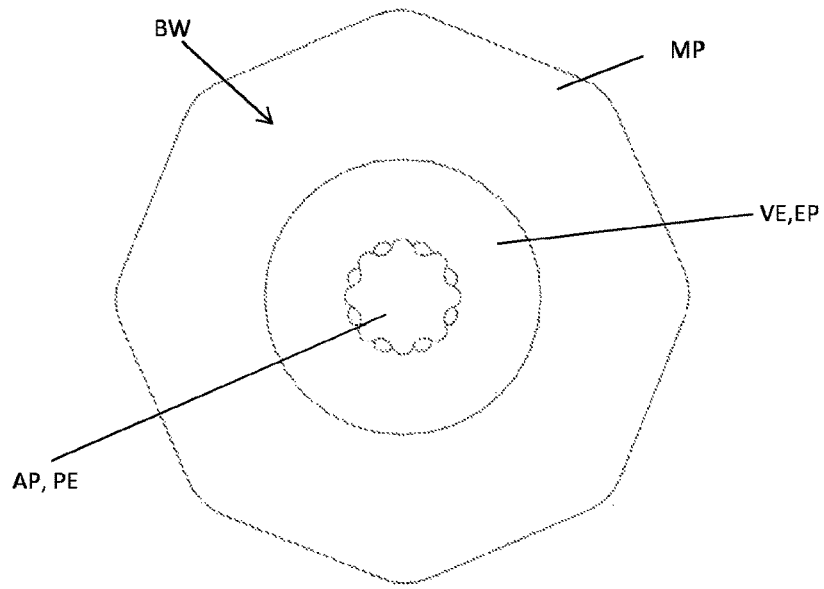
FIG. 7 depicts a bottom view of the fluid dose-measuring device of FIG. 1 in a second situation.

FIG. 1 shows the fluid dose-measuring device in an exploded view, so that the different components of the fluid dose-measuring device can easily be recognized. FIG. 2 shows the fluid dose-measuring device in a cross-sectional view to show the interior of the device. FIG. 3 shows the fluid dose-measuring device prior to being positioned in a dispensing device. FIG. 4 shows separately the dose-measuring device and a fluid container to which the dose-measuring device is connectable. FIG. 5 shows the dose measuring device and the fluid container in a connected configuration. FIGS. 6 and 7 depict a bottom view of the fluid dose-measuring device.

The fluid dose-measuring device according to the embodiment of the FIGS. 1-7 comprises a housing with a stationary part SP and a moveable part MP. The stationary part comprises a connector portion CP defining an inlet passage IP, which connector portion allows to connect the fluid dose-measuring device to a fluid container (as shown in FIG. 5).

The stationary part SP comprises a top wall TW and a peripheral wall PW1 extending from the top wall, wherein the connector portion extends from the top wall opposite the peripheral wall.

In this embodiment, the connector portion CP is a male part to be connected to a female part FP of a fluid container FC. The female part may be a body containing an axial bore which extends from an insert opening for the female part through the body, and a seat extending around the bore for a plug PL which serves to close off the bore. The bore of the female part preferably forms a shoulder between the insert opening and the seat, said shoulder facing towards the insert opening. The plug may be provided with at least one elastic hooking part with corresponding hooking surface, wherein the hooking part rests in a first position with its hooking surface against the shoulder, and wherein the male part has a head HE and a recess located behind the head for receiving the hooking part of the plug when the male part is inserted into the bore, so that the plug connects with the male part, i.e. corresponding to a first connection position. In the first connection position, male part is connected to the plug of the female part where the plug of the female part still closes off the bore.

When the male part is pushed further, i.e. to a second connection position as shown in FIG. 5, the plug disengages from the seat allowing fluid communication between the inside of the fluid container FC and the fluid dose-measuring device. Subsequently pulling the male part back to the first connection position may result in closing of the bore by the plug again. For instance, a connector assembly according to WO 99/05446 is used. An advantage is that connecting and disconnecting the male part, i.e. the device, automatically opens and closes the fluid container without the risk of leakage. Disconnecting the fluid dose-measuring device may be advantageous when the fluid container is used again and needs to be refilled. It is noted here that depending on the design of the fluid dose-measuring device, a refill may also be done via the fluid dose-measuring device, so that disconnecting the fluid dose-measuring device is not essential.

Connecting the fluid dose-measuring device to a filled fluid container may expose the content of the fluid container to air already present in the dose-measuring device. It may therefore be desired that the fluid dose-measuring device is pre-assembled to the fluid container, but fluid communication between fluid container and fluid dose-measuring device is blocked until the fluid container is used, i.e. will be emptied. The connection between fluid dose-measuring device and fluid container may therefore at first be such that fluid communication is prevented, e.g. corresponding to a first position as described above, but when the fluid container including dose-measuring device is placed in a dispensing device the blockage is removed automatically by an actuator, e.g. in the form of a leverage pushing the device further into the container, or by a coupling action of an operator, such as a twist or push action of the fluid dose-measuring device relative to the fluid container, e.g. corresponding to a second position as described above. This may be combined with a tamper-evident device, showing that the content of the fluid container has not been exposed to air, not even the small amount of air that may be present in the fluid dose-measuring device itself.

Other connector portions as known in the prior art are also envisaged to connect the fluid dose-measuring device to a fluid container.

The moveable part MP comprises a bottom wall BW and a peripheral wall PW2 extending from the bottom wall.

The moveable part MP is rotatable about a longitudinal axis LA of the housing. The moveable part MP is configured to engage with an actuator A of a dispensing device DD as shown in FIG. 3. In this embodiment, the outer contour of the moveable part has a polygon shape, in this case a convex polygon shape in the form of a hexagonal shape. This allows an actuator to engage with the moveable part to drive the moveable part. Preferably, the inner contour of the actuator A matches, i.e. is complementary to, the outer contour of the moveable part for smooth engagement.

The stationary part SP may have a similar outer contour as the moveable part MP. Where the outer contour of the moveable part is designed to be engaged by an actuator for moving the moveable part of the housing, the same shape can advantageously be used such that the stationary part can be engaged by a dispensing device to keep the stationary part stationary relative to the dispensing device thereby allowing the moveable part to move relative to the stationary part.

Although having similar or identical outer contours may be beneficial, it is not essential to have similar outer contours. Different outer contours may also be used and also fall within the scope of the invention.

In order to prevent leakage from the housing, the moveable part MP preferably sealingly engages with the stationary part, such that movement between the moveable and stationary parts is allowed, but fluid cannot escape from the housing via the connection between moveable and stationary part. In this embodiment, the peripheral wall PW1 of the stationary part SP sealingly engages with the peripheral wall PW2 of the moveable part MP.

The stationary and moveable part SP, MP provide an inner space for accommodating an internal gear pump which, as is known from the prior art, comprises an inner gear IG and an outer gear OG, wherein the outer gear has one teeth more than the inner gear, wherein a rotation axis of the inner gear is offset relative to a rotation axis of the outer gear, and wherein both gears are able to rotate together thereby using the meshing of the gears to pump fluid by displacement.

According to the first aspect of the invention, the moveable part MP is integral with the outer gear OG. This is embodied here by forming the outer gear at an inner surface of the moveable part. As a result thereof, rotation of the moveable part rotates the outer gear as well. Due to the meshing of the teeth of the inner and outer gear, rotation of the outer gear will also result in rotation of the inner gear. The rotation axis of the outer gear thus coincides with the rotation axis of the moveable part being in this case the longitudinal axis LA of the housing.

According to a second aspect of the invention, there is provided an axle part AP forming the axle around which the inner gear can rotate. The axle part AP defines a rotation axis that is offset relative to the longitudinal axis of the housing, i.e. offset relative to the rotation axis of the outer gear for a proper functioning of the internal gear pump.

The axle part comprises a hollow axle portion defining an outlet passage OP. The axle part AP is further configured to guide fluid from the inlet passage IP to an intake side IS of the internal gear pump and from the compression side CS of the internal gear pump to the outlet passage OP as will be explained below in more detail. Both the intake side IS and the compression side CS are at the same side of the internal gear pump.

The housing further comprises an outlet O, which is in fluid communication with the outlet passage in the axle part. The outlet is in this case provided with a valve element VE according to the third aspect of the invention, which can advantageously be used to prevent undesired dripping of fluid from the fluid dose-measuring device and/or can be used to prevent fluid in the outlet passage from drying out.

In this embodiment, the valve element VE comprises an elastomer part EP arranged between the moveable part MP of the housing and a profiled end PE of the axle part AP. The shape of the elastomer part at the profiled end PE is complementary to the profiled end of the axle part, so that in first angular orientations of the elastomer part relative to the profiled end of the axle part the valve element closes off the outlet as shown in FIG. 6, and that in second angular orientations of the elastomer part relative to the profiled end of the axle part the valve element allows the passage of fluid between the elastomer part and the profiled end as shown in FIG. 7. The elastomer part EP is configured to move along with the moveable part MP of the housing, so that the elastomer part moves relative to the profiled end of the axle part, thereby causing the valve element to periodically close off the outlet and allow the passage of fluid.

In order to aid the fluid in passing the valve, the inner gear may be recessed around the profiled end of the axle part, so that there is enough room around the profiled end of the axle part for the fluid to pass the profiled end. This is in this embodiment implemented by recesses RE1. Further shown are recesses RE2 in the elastomer part of the valve element which cooperate with recesses RE1.

Due to the second aspect of the invention it is possible to provide the outlet passage and outlet more or less in line with the inlet passage, so that from an operation point of view it seems as of the fluid dose-measuring device is transporting the fluid in a single direction.

In an alternative embodiment, the valve element is made from an elastomer with a slit in the centre through which fluid is dispensed, which may alternatively be referred to as a slit valve. The resiliency of the elastomer material keeps the valve closed when there is not sufficient fluid pressure. When the fluid pressure is above a certain threshold, the valve opens to allow the passage of fluid. This embodiment does not require the presence of a profiled end on the axle part. The slit valve may be attached to the axle part, but may also be fixed to the moveable part of the housing, so that the slit valve rotates along with the moveable part. In case of the latter, it is preferred that the slit valve is provided at or near the rotation axis of the moveable part so that the position of the outlet of the housing is preferably independent of the angular orientation of the moveable part relative to the stationary part.

The method to dispense fluid from the fluid container using the fluid dose-measuring device will now be described by reference to the FIG. 2. FIG. 2 shows a flow path FP.

In order to dispense a predetermined amount of fluid from the fluid container, the inlet passage IP is brought into fluid communication with the interior of the fluid container, e.g. as shown in FIG. 4. The teeth of the inner and outer gear IG, OG form multiple chambers with different volumes depending on the angular orientation of the gears. By appropriately rotating the moveable part and thereby the gears the volumes of the chambers between the teeth of the inner and outer gear increase at the intake side IS of the internal gear pump motor thereby drawing fluid into the inlet passage IP from the fluid container and from the inlet passage into the chambers of the internal gear pump. The fluid is then rotated by the internal gear pump to the compression side CS of the internal gear pump. At the compression side CS the volumes of the chambers decrease thereby forcing fluid upwards out of the internal gear pump and into the hollow axle portion through the outlet O.

Although it will not be described in detail, it will be apparent to the skilled person that the internal gear pump can also be used to pump fluid into the fluid container, e.g. when the fluid container is refilled at a refill station. The fluid will then flow along the flow path FP in a reverse direction as described above. This has the advantage that the fluid dose-measuring device does not have to be separated from the fluid container in order to refill the fluid container.

The fluid dose-measuring device is adapted to be received in a dispensing device, wherein preferably the dispensing device comprises an actuator to drive the fluid dose-measuring device.

CLAUSES

1. Fluid dose-measuring device for dispensing predetermined amounts of fluid from a fluid container, comprising:
   a. a housing with a stationary part and a moveable part, wherein the stationary part comprises a connector portion defining an inlet passage, which connector portion is connectable to the fluid container, wherein the moveable part is configured to engage with an actuator of a dispensing device, and wherein the housing comprises an outlet through which the fluid is to be dispensed; and
   b. an internal gear pump with an inner gear and an outer gear for transporting fluid from the inlet passage of the housing to the outlet of the fluid dose-measuring device upon actuation by the actuator of the dispensing device,
   wherein the moveable part of the housing is connected to the outer gear of the internal gear pump, so that actuation of the moveable part of the housing allows to rotate the inner and outer gear of the internal gear pump relative to the stationary part of the housing.
2. Device according to clause 1, wherein the fluid dose-measuring device is adapted to be releasably received in the dispensing device, and wherein the fluid dose-measuring device is preferably disposable.
3. Device according to clause 1, wherein the stationary part comprises a top wall and a peripheral wall extending from the top wall, wherein the connector portion extends from the top wall opposite the peripheral wall.
4. Device according to clause 1, wherein the moveable part comprises a bottom wall and a peripheral wall extending from the bottom wall, said peripheral wall having over at least a part of its height an outer shape for engagement with the actuator of the dispensing device and an inner shape forming the outer gear of the internal gear pump.
5. Device according to clauses 3 and 4, wherein the peripheral wall of the moveable part sealingly engages with the peripheral wall of the stationary part.
6. Device according to clause 1, further comprising an axle part around which the inner gear can rotate.
7. Device according to clause 1, wherein the axle part comprises an outlet passage for guiding fluid to the outlet of the housing.
8. Device according to clause 1, wherein the internal gear pump comprises an intake side where fluid is drawn from the fluid container and a compression side where fluid is expelled towards an outlet, wherein the intake side is in fluid communication with the connector part.
9. Device according to clauses 7 and 8, wherein the compression side is in fluid communication with the outlet passage of the axle part.
10. Device according to clause 1, wherein the outlet is provided in the moveable part.
11. Device according to clause 1, wherein the outlet is provided in the stationary part.
12. Device according to clause 1, wherein the outlet comprises a valve element.
13. Device according to clause 12, wherein the valve element comprises an elastomer part such that the resiliency of the valve element can be used to open and close the valve.
14. Device according to clause 13, wherein the elastomer part functions as a slit valve.
15. Device according to clauses 9, 10, 12 and 13, wherein the elastomer part of the valve element is connected to the moveable part of the housing, and wherein the axle part comprises a profiled end engaging with the elastomer part of the valve element, such that upon rotation of the moveable part including elastomer part relative to the profiled end the valve is periodically opened and closed.
16. Fluid dose-measuring device for dispensing predetermined amounts of fluid from a fluid container, comprising:
   a. a housing with a stationary part and a moveable part, wherein the stationary part comprises a connector portion defining an inlet passage, which connector portion is connectable to the fluid container, wherein the moveable part is configured to engage with an actuator of a dispensing device, and wherein the housing comprises an outlet through which the fluid is to be dispensed, b. an internal gear pump with an inner gear and an outer gear for transporting fluid from the inlet passage of the housing to an outlet of the fluid dose-measuring device upon actuation by the actuator of the dispensing device, wherein the internal gear pump comprises an intake side where fluid is drawn from the fluid container and a compression side where fluid is expelled towards the outlet, and c. an axle part forming an axle around which the inner gear can rotate, wherein the axle defines an outlet passage in fluid communication with the outlet, wherein the inlet passage is in fluid communication with the intake side of the internal gear pump, and wherein the outlet passage is in fluid communication with the compression side of the internal gear pump.

17. Device according to clause 16, wherein the intake side and the compression side are arranged at a same side of the internal gear pump.

18. Device according to clause 16, wherein the inlet passage and the outlet passage extend in substantially the same direction.

19. Fluid dose-measuring device for dispensing predetermined amounts of fluid from a fluid container, comprising a valve element with a stationary member and a rotatable member engaging with one another, wherein one of the stationary and rotatable member comprises elastomer material and the other one is substantially undeformable, wherein rotation of the rotatable member relative to the stationary member periodically opens and closes the valve due to deformation of the elastomer material.

20. Device according to clause 19, wherein the rotatable member surrounds the stationary member, wherein the stationary member has a profiled shape, and wherein the rotatable member has a shape complementary to the profiled shape.

21. Dispensing device comprising a fluid dose-measuring device according to any of the clauses 1-20.

22. Device according to clause 21, comprising an actuator to drive the fluid dose-measuring device.

The invention claimed is:

1. Fluid dose-measuring device for dispensing predetermined amounts of fluid from a fluid container, comprising:
   a housing with a stationary part and a moveable part, wherein the stationary part comprises a connector portion defining an inlet passage, which connector portion is connectable to the fluid container, wherein the moveable part is rotatable relative to the stationary part about a longitudinal axis of the housing, wherein the moveable part is configured to engage with an actuator of a dispensing device, and wherein the housing comprises an outlet through which the fluid is to be dispensed; and
   an internal gear pump with an inner gear being positioned within an outer gear extending therearound for transporting fluid from the inlet passage of the housing to the outlet of the fluid dose-measuring device upon actuation by the actuator of the dispensing device, wherein the moveable part of the housing is connected to the outer gear of the internal gear pump, so that external actuation of the moveable part of the housing allows to rotate the inner and outer gear of the internal gear pump relative to the stationary part of the housing;
   wherein the moveable part comprises a bottom wall and a peripheral wall extending from the bottom wall, said peripheral wall having over at least a part of its height an outer shape for engagement with the actuator of the dispensing device and an inner shape forming the outer gear of the internal gear pump.

2. Device according to claim 1, wherein the fluid dose-measuring device is adapted to be releasably received in the dispensing device, and wherein the fluid dose-measuring device is preferably disposable.

3. Device according to claim 1, wherein the stationary part comprises a top wall and a peripheral wall extending from the top wall, wherein the connector portion extends from the top wall opposite the peripheral wall.

4. Fluid dose-measuring device for dispensing predetermined amounts of fluid from a fluid container, comprising:
   a housing with a stationary part and a moveable part, wherein the stationary part comprises a connector portion defining an inlet passage, which connector portion is connectable to the fluid container, wherein the moveable part is rotatable relative to the stationary part about a longitudinal axis of the housing, wherein the moveable part is configured to engage with an actuator of a dispensing device, wherein the moveable part comprises a bottom wall and a peripheral wall extending from the bottom wall, the peripheral wall of the moveable part sealingly engages with the peripheral wall of the stationary part, wherein the housing comprises an outlet through which the fluid is to be dispensed, wherein the stationary part comprises a top wall and a peripheral wall extending from the top wall, and wherein the connector portion extends from the top wall opposite the peripheral wall; and
   an internal gear pump with an inner gear being positioned within an outer gear extending therearound for transporting fluid from the inlet passage of the housing to the outlet of the fluid dose-measuring device upon actuation by the actuator of the dispensing device, wherein the moveable part of the housing is connected to the outer gear of the internal gear pump, so that external actuation of the moveable part of the housing allows to rotate the inner and outer gear of the internal gear pump relative to the stationary part of the housing.

5. Fluid dose-measuring device for dispensing predetermined amounts of fluid from a fluid container, comprising:
   a housing with a stationary part and a moveable part, wherein the stationary part comprises a connector portion defining an inlet passage, which connector portion is connectable to the fluid container, wherein the moveable part is rotatable relative to the stationary part about a longitudinal axis of the housing, wherein the moveable part is configured to engage with an actuator of a dispensing device, and wherein the housing comprises an outlet through which the fluid is to be dispensed;
   an internal gear pump with an inner gear being positioned within an outer gear extending therearound for transporting fluid from the inlet passage of the housing to the outlet of the fluid dose-measuring device upon actuation by the actuator of the dispensing device, wherein the moveable part of the housing is connected to the outer gear of the internal gear pump, so that external actuation of the moveable part of the housing allows to rotate the inner and outer gear of the internal gear pump relative to the stationary part of the housing, wherein the internal gear pump comprises an intake side where fluid is drawn from the fluid container and a compression side where fluid is expelled towards an outlet, and wherein the intake side is in fluid communication with the connector part; and an axle part around which the inner gear can rotate, wherein the compression side is in fluid communication with an outlet passage of the axle part.

6. Device according to claim 5, wherein the axle part comprises an outlet passage for guiding fluid to the outlet of the housing.

7. Fluid dose-measuring device for dispensing predetermined amounts of fluid from a fluid container, comprising:

a housing with a stationary part and a moveable part, wherein the stationary part comprises a connector portion defining an inlet passage, which connector portion is connectable to the fluid container, wherein the moveable part is rotatable relative to the stationary part about a longitudinal axis of the housing, wherein the moveable part is configured to engage with an actuator of a dispensing device, wherein the housing comprises an outlet through which the fluid is to be dispensed, and wherein the outlet is provided in the moveable part; and an internal gear pump with an inner gear being positioned within an outer gear extending therearound for transporting fluid from the inlet passage of the housing to the outlet of the fluid dose-measuring device upon actuation by the actuator of the dispensing device, wherein the moveable part of the housing is connected to the outer gear of the internal gear pump, so that external actuation of the moveable part of the housing allows to rotate the inner and outer gear of the internal gear pump relative to the stationary part of the housing.

8. Device according to claim 7, wherein the outlet is provided in the stationary part.

9. Device according to claim 7, wherein the outlet comprises a valve element.

10. Device according to claim 9, wherein the valve element comprises an elastomer part such that the resiliency of the valve element can be used to open and close the valve.

11. Device according to claim 10, wherein the elastomer part functions as a slit valve.

12. Device according to claim 7, wherein the valve element comprises an elastomer part, the elastomer part of the valve element is connected to the moveable part of the housing, and wherein the axle part comprises a profiled end engaging with the elastomer part of the valve element, such that upon rotation of the moveable part including elastomer part relative to the profiled end the valve is periodically opened and closed.

13. Fluid dose-measuring device for dispensing predetermined amounts of fluid from a fluid container, comprising:

a housing with a stationary part and a moveable part, wherein the stationary part comprises a connector portion defining an inlet passage, which connector portion is connectable to the fluid container, wherein the moveable part is rotatable relative to the stationary part about a longitudinal axis of the housing, wherein the moveable part is configured to engage with an actuator of a dispensing device, and wherein the housing comprises an outlet through which the fluid is to be dispensed;

an internal gear pump with an inner gear being positioned within an outer gear extending therearound for transporting fluid from the inlet passage of the housing to the outlet of the fluid dose-measuring device upon actuation by the actuator of the dispensing device, wherein the moveable part of the housing is connected to the outer gear of the internal gear pump, so that external actuation of the moveable part of the housing allows to rotate the inner and outer gear of the internal gear pump relative to the stationary part of the housing; and a valve element with a stationary member and a rotatable member engaging with one another, wherein one of the stationary and rotatable member comprises elastomer material and the other one is substantially undeformable, wherein one of the stationary and rotatable member is connected to the moveable part of the housing and the other one of the stationary and rotatable member is connected to the stationary part, and wherein rotation of the rotatable member relative to the stationary member periodically opens and closes the valve due to deformation of the elastomer material.

14. Device according to claim 13, wherein the rotatable member surrounds the stationary member, wherein the stationary member has a profiled shape, and wherein the rotatable member has a shape complementary to the profiled shape.

15. Fluid dose-measuring device for dispensing predetermined amounts of fluid from a fluid container, comprising:

a. a housing with a stationary part and a moveable part, wherein the stationary part comprises a connector portion defining an inlet passage, which connector portion is connectable to the fluid container, wherein the moveable part is rotatable relative to the stationary part about a longitudinal axis of the housing, wherein the moveable part is configured to engage with an actuator of a dispensing device, and wherein the housing comprises an outlet through which the fluid is to be dispensed, b. an internal gear pump with an inner gear and an outer gear for transporting fluid from the inlet passage of the housing to an outlet of the fluid dose-measuring device upon actuation by the actuator of the dispensing device via the moveable part of the housing, wherein the internal gear pump comprises an intake side where fluid is drawn from the fluid container and a compression side where fluid is expelled towards the outlet, and c. an axle part forming an axle around which the inner gear can rotate, wherein the axle defines an outlet passage in fluid communication with the outlet, wherein the inlet passage is in fluid communication with the intake side of the internal gear pump, and wherein the outlet passage is in fluid communication with the compression side of the internal gear pump.

16. Device according to claim 15, wherein the intake side and the compression side are arranged at a same side of the internal gear pump.

17. Device according to claim 15, wherein the inlet passage and the outlet passage extend in substantially the same direction.

18. Device according to claim 4, wherein the fluid dose-measuring device is adapted to be releasably received in the dispensing device, and wherein the fluid dose-measuring device is preferably disposable.

19. Device according to claim 4, wherein the stationary part comprises a top wall and a peripheral wall extending from the top wall, wherein the connector portion extends from the top wall opposite the peripheral wall.

* * * * *